(12) United States Patent
Tam et al.

(10) Patent No.: US 11,897,241 B2
(45) Date of Patent: Feb. 13, 2024

(54) MODULAR SYSTEM FOR FABRICATING A LAMINATE

(71) Applicant: GM GLOBAL TECHNOLOGY OPERATIONS LLC, Detroit, MI (US)

(72) Inventors: Wai Ping Gloria Tam, Troy, MI (US); David F. Titmuss, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 17/725,028

(22) Filed: Apr. 20, 2022

(65) Prior Publication Data
US 2023/0339224 A1     Oct. 26, 2023

(51) Int. Cl.
*B32B 37/02*     (2006.01)
*B32B 37/00*     (2006.01)
*B32B 37/20*     (2006.01)

(52) U.S. Cl.
CPC .......... *B32B 37/02* (2013.01); *B32B 37/0053* (2013.01); *B32B 37/20* (2013.01); *B32B 2309/02* (2013.01); *B32B 2309/12* (2013.01); *B32B 2309/72* (2013.01); *B32B 2311/00* (2013.01); *B32B 2457/10* (2013.01)

(58) Field of Classification Search
None
See application file for complete search history.

(56) References Cited

U.S. PATENT DOCUMENTS

| | | | |
|---|---|---|---|
| 6,807,729 B2 | 10/2004 | Kawashima et al. | |
| 10,601,071 B2* | 3/2020 | Visco | G01N 21/896 |
| 2005/0252602 A1 | 11/2005 | Tateishi | |
| 2019/0010005 A1 | 1/2019 | Ramakrishnan et al. | |
| 2019/0181496 A1 | 6/2019 | Visco et al. | |
| 2020/0280063 A1* | 9/2020 | Tiruvannamalai | H01M 4/74 |

FOREIGN PATENT DOCUMENTS

EP     0324892 A2     7/1989

\* cited by examiner

*Primary Examiner* — Michael N Orlando
*Assistant Examiner* — Abhishek A Patwardhan
(74) *Attorney, Agent, or Firm* — Quinn IP Law

(57) ABSTRACT

A lamination system is contemplated. The system may have a modular design configured to fabricate a laminate from an incoming material. The system may be configured to produce the laminate with an outer layer comprising the incoming material such that the resulting layer has a width greater than a width of the incoming material prior to lamination.

15 Claims, 6 Drawing Sheets

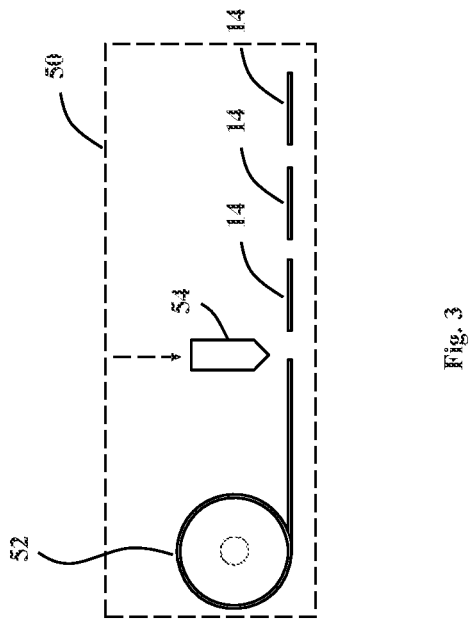
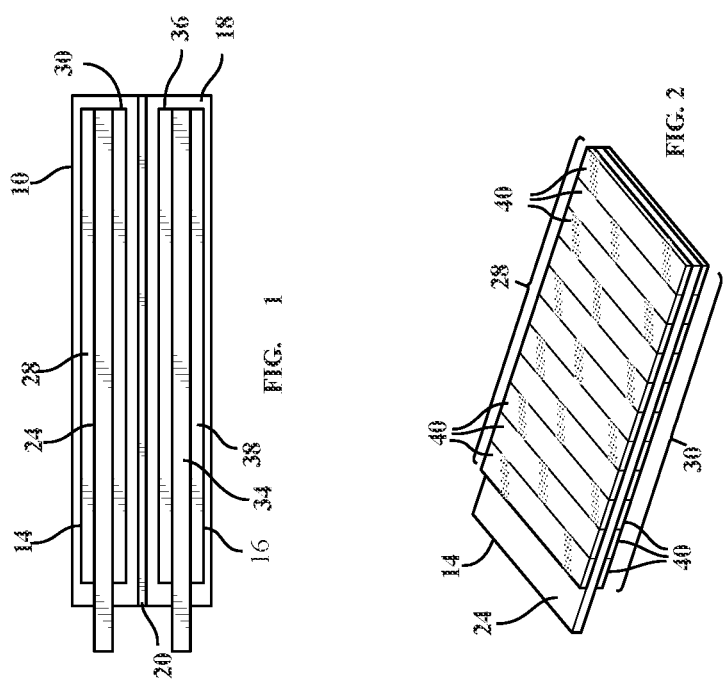

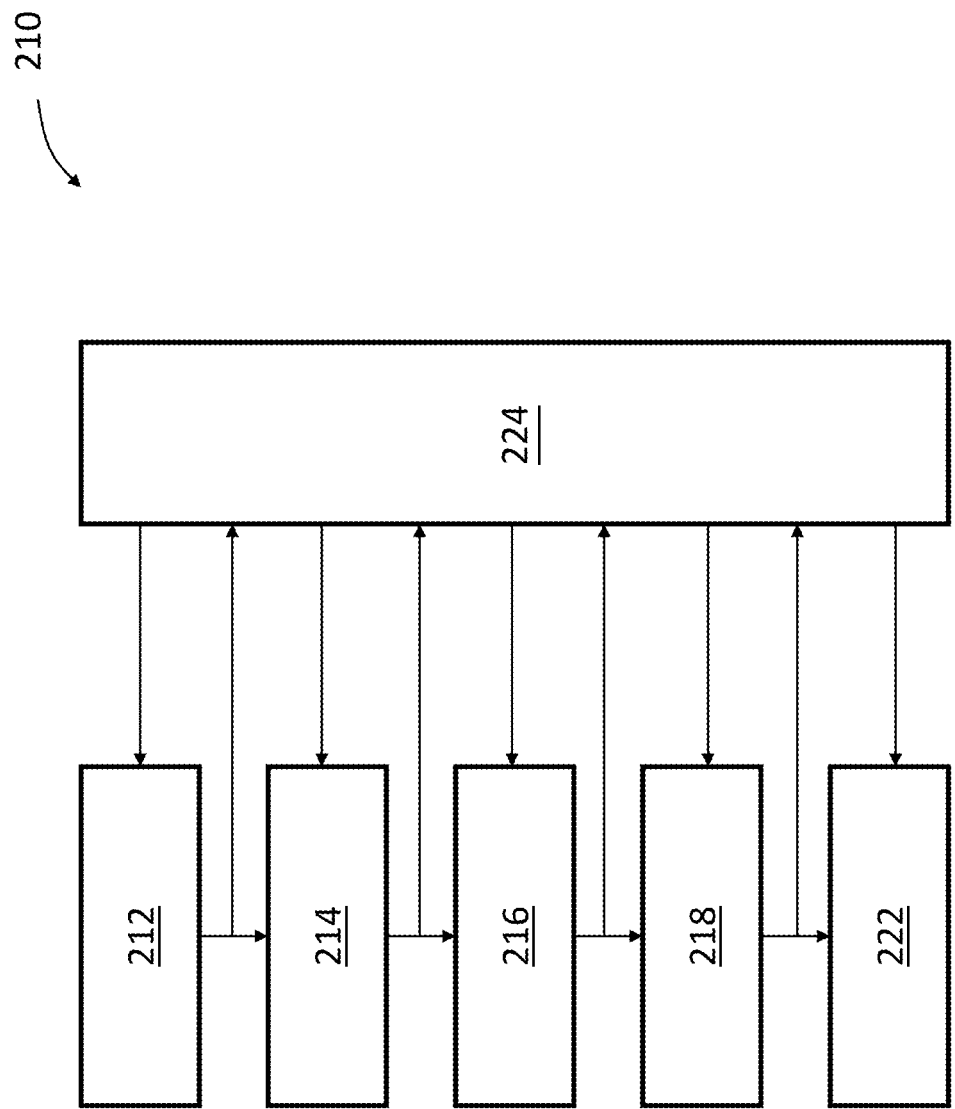

MODULAR SYSTEM FOR FABRICATING A LAMINATE

INTRODUCTION

The present disclosure relates to a modular system for fabricating a laminate, such as but not necessarily limited to a lamination system with a modular design configured to fabricate the laminate to a width greater than a width of an incoming lithium foil or other material included as an integral part thereof.

A cell of a battery, i.e., a battery cell, may include an anode, a cathode, an electrolyte, and a separator. The anode and the cathode may include active materials to exchange ions through the electrolyte and separator for purposes of providing an electrical isolation between the anode and the cathode. The anode may be considered as a metal anode when comprised of one or more conducting metals, or more particularly, a lithium metal anode when comprised of a lithium foil laminated over a copper or other type of electrically conducting collector substrate. The use of lithium metal anodes, particularly with batteries and/or battery cells, may be preferred over anodes having other types of material compositions due to the beneficial characteristics of lithium.

The use of lithium or lithium foil as a lamination for metal anodes, or for other purposes, is severely restricted due to an inability of lithium manufacturers to produce lithium foil above a defined or limited width. In the application of electric vehicle batteries, for example, large format lithium metal anodes may be preferred to reduce the number of individual cells required to meet certain battery pack kWh requirements. To manufacture such large format lithium metal anodes, a relatively wide (>200 mm) and continuous lithium metal anode roll may be preferred for a more cost effective and efficient cell assembly process. However, as one having ordinary skill in the art would appreciate, the fabrication of a wide (>200 mm wide) and continuous lithium metal anode roll using lamination method is severely restricted due to an inability of lithium manufacturers to produce lithium foil above a defined or limited width. The current inability of lithium manufacturers to manufacture lithium foil with a width greater than 100-150 mm is well known.

SUMMARY

Disclosed herein is a solution for fabricating a laminate with a lamination of lithium foil or other material having a width greater than a width of the lithium foil or other material available from manufacturers. One non-limiting aspect of the present disclosure contemplates a lamination system with a modular design providing a solution for fabricating a lithium metal anode whereby width restricted lithium foil is made use of to produce the lithium metal anode with a lamination of lithium foil having an overall width of lithium greater than the individual width of lithium foil available from manufacturers, e.g., greater than 100-150 mm. Another non-limiting aspect of the present disclosure contemplates the modular system being suitable for use with other width restricted materials in additional to lithium foil, such as for use with other materials incapable of being manufactured above certain widths and/or for producing other types of laminates besides laminates used for metal anodes.

The present teachings contemplate a method of making a laminate by unwinding a collector flow of a collector material from a collector spool, unwinding a first lamination flow of a first material from a first lamination spool, and unwinding a second lamination flow of a second material from a second lamination spool. The method includes producing a first laminate by laminating the first material to the collector material with a first lamination roller positioned downstream of the collector spool such that the first laminate includes the first material and the collector material. The method includes producing a second laminate by laminating the second material to the collector material with a second lamination roller positioned downstream of the first lamination roller such that the second laminate includes the second material, the first material, and the collector material.

The method may include unwinding a third lamination flow of a third material from a third lamination spool and producing a third laminate by laminating the third material to the collector material with a third lamination roller positioned downstream of the second lamination roller such that the third laminate includes the third material, the second material, the first material, and the collector material. The third laminate may include the first material, the second material, and the third material on one or both sides of the collector material.

The method may include aligning the second material on the second laminate to be side-by-side and parallel with the first material and aligning the third material on the third laminate to be side-by-side and parallel with the second material. The second material may be aligned with a second edge positioning system (EPS) configured to adjust the second lamination spool in a cross direction (CD) where the CD is defined relative to a machine direction (MD) corresponding with an unrolling direction of the collector material from the collector spool to the laminate spool. The third material may be similarly aligned with a third EPS configured to adjust the third lamination spool in the CD.

The method may include controlling the third lamination roller to apply a third pressure for laminating, controlling the second lamination roller to apply a second pressure for laminating less than the third pressure, and controlling the first lamination spool roller to apply a first pressure for laminating less than the second pressure.

The method may include controlling the third lamination roller to apply a third heat for laminating, controlling the second lamination roller to apply a second heat for laminating, and controlling the first lamination spool roller to apply a first heat for laminating.

The method may include aligning the second and third EPSs and determining the first, second, and third heats and pressures as a function of information received from one or more of a first inspection tool configured to inspect the first laminate, a second inspection tool configured to inspect the second laminate, and a third inspection tool configured to inspect the third laminate. The information may be used for identifying thickness, alignment, edge quality, and/or surface quality.

The method may include determining the first, second, and third pressures as a function of a thickness desired for the third laminate, including setting the third pressure to a value sufficient to spread the third laminate to the thickness and setting the first and second pressures to values insufficient to spread an entirety of either one of the first and second laminates to the thickness.

The method may include unwinding a first interleaf from the first lamination flow using a first interleaf rewind positioned upstream of the first lamination roller, unwinding a second interleaf from the second lamination flow using a second interleaf rewind positioned upstream of the second lamination roller, and laminating a finished interleaf to the third laminate prior rewinding into the laminate spool.

The method may produce the laminate with the collector material substantially including copper and the first, second, and third materials substantially including lithium foil.

The present teachings contemplate a lamination system with a modular design for fabricating a lithium metal anode to have a width at least three times as wide as a width of an incoming lithium foil to be included as an integral part of the lithium metal anode. The system may include a collector spool having a collector flow of a collector material, a first lamination spool having a first lamination flow of the lithium foil, a first lamination roller positioned downstream of the collector spool configured to produce a first laminate by laminating the first lamination flow to the collector material, a second lamination spool having a second lamination flow of the lithium foil, a second lamination roller positioned downstream of the first lamination roller configured to produce a second laminate by laminating the second lamination flow to the collector material, a third lamination spool having a third lamination flow of the lithium foil, and a third lamination roller positioned downstream of the second lamination roller configured to produce a third laminate by laminating the third lamination flow to the collector material.

The system may include a first interleaf rewind positioned upstream of the first lamination roller configured to unwind a first interleaf from the first lamination flow, a second interleaf rewind positioned upstream of the second lamination roller configured to unwind a second interleaf from the second lamination flow, and a finished interleaf spool positioned upstream of a laminate spool where the finished interleaf spool includes an interleaf lamination flow of an interleaf material configured to be interlaid with the third laminate.

The system may include a positioning system configured to align the first, second, and third lamination flows such that the second lamination flow is laminated side-by-side and parallel to the first lamination flow and the third lamination flow is laminated side-by-side and parallel to the second lamination flow, and to adjust heat and pressure provided by the first, second, and third rollers to limit over spreading of the lithium foil.

The system may produce the third laminate with the lithium foil on one or both sides of the collector material.

The present teachings contemplate a system for fabricating a laminate to have a width greater than a defined width for a lamination material. The system may include a first module having a first lamination spool with a first lamination flow of the lamination material, and a first lamination roller positioned downstream of a collector spool where the first lamination roller is configured to produce a first laminate by laminating the first lamination flow to a collector flow unwound from the collector spool. The system may include a second module having a second lamination spool with a second lamination flow of the lamination material, and a second lamination roller positioned downstream of the first lamination roller where the second lamination roller is configured to produce a second laminate by laminating the second lamination flow to the first laminate.

The system may include the first and second laminates being pairs of the lamination material on one or both sides of the collector flow.

The above features and advantages, and other features and attendant advantages of this disclosure, will be readily apparent from the following detailed description of illustrative examples and modes for carrying out the present disclosure when taken in context with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 1 schematically illustrates a side sectional view of an exemplary battery cell in accordance with one non-limiting aspect of the present disclosure.

FIG. 2 schematically illustrates a perspective view of a single anode with a grouping of lithium foil laminations in accordance with one non-limiting aspect of the present disclosure.

FIG. 3 schematically illustrates a cutting system in accordance with one non-limiting aspect of the present disclosure.

FIG. 8 illustrates a control mechanism flow diagram for a method of making a laminate in accordance with one non-limiting aspect of the present disclosure.

Figure 4:
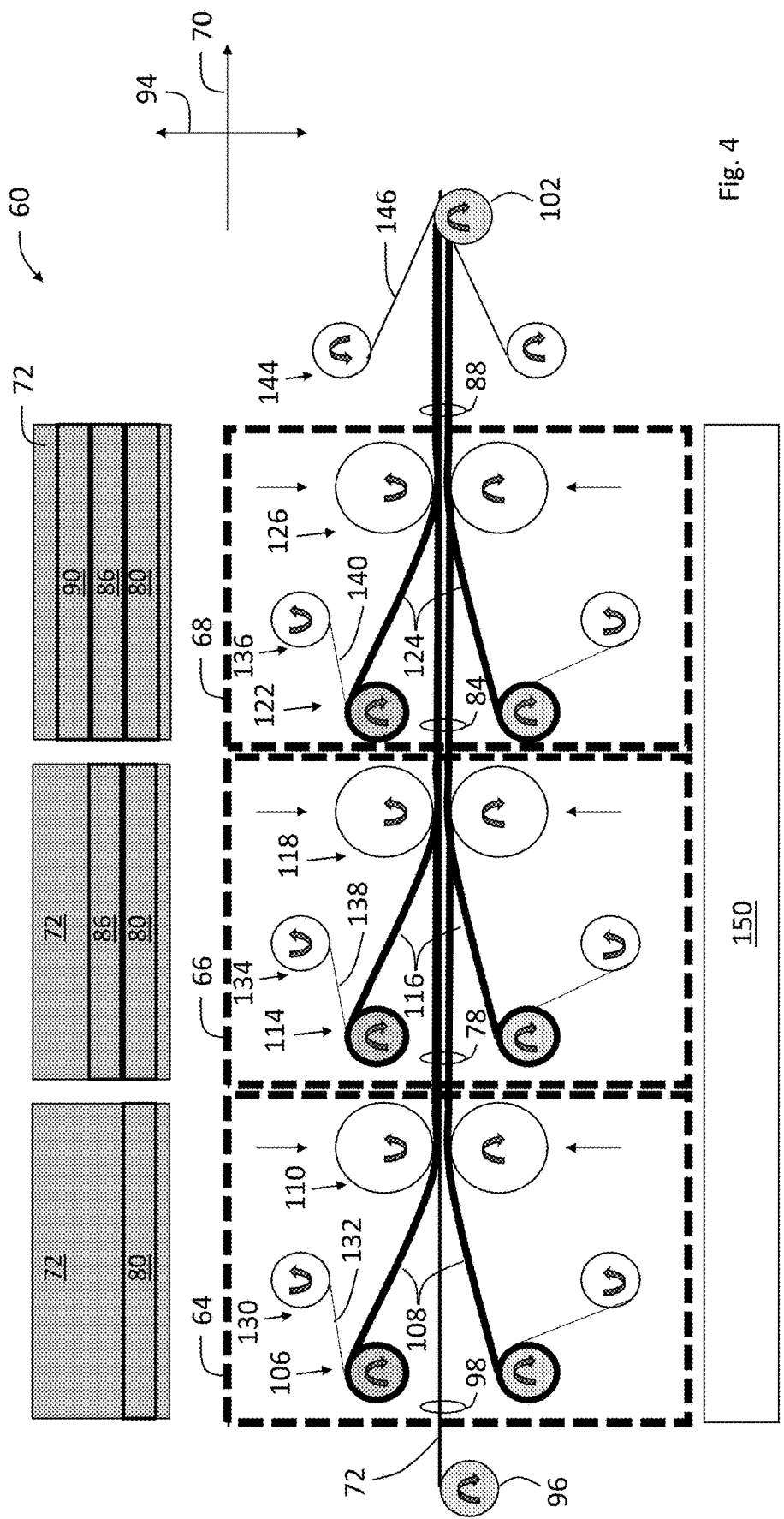
FIGS. 4-5 respectively illustrate a schematic side and top views of a modular system for fabricating a laminate in accordance with one non-limiting aspect of the present disclosure.

The above features and advantages and other features and advantages of the present teachings are readily apparent from the following detailed description of the modes for carrying out the present teachings when taken in connection with the accompanying drawings. It should be understood that even though the following figure embodiments may be separately described, single features thereof may be combined to additional embodiments.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The present disclosure relates to a modular system for fabricating a laminate of various types, such as but not necessarily limited to a modular system configured for fabricating the laminate as a lithium metal anode having a width greater than a width of an incoming lithium foil included as an integral part thereof. The present disclosure is predominantly described with respect to this use of lithium foil to demonstrate one advantageous application of the present disclosure with respect addressing shortcomings in the manufacturing supply of lithium foil, i.e., an inability of lithium foil manufacturers to provide individual strips of lithium foil wider than a restricted width of about 100-150 mm. The present disclosure highlights its applicability in overcoming shortcomings associated with manufacturing lithium foil for exemplary, non-limiting purposes as the modular system described herein is suitable and beneficial for fabricating other types of laminates, including laminates having materials other than lithium foil and/or substrates other than current collectors comprised predominantly of copper.

As described more herein, lithium may be laminated onto or into an electrode structure including a metal conducting layer with an active material mixture of, for example, a nano-composite of silicon monoxide, together with graphite and a binder, such as polyvinyl di-fluoride (PVDF). The lamination of lithium metal onto or into the electrode structure may be used to reduce the amount of irreversible capacity by readily supplying an amount of lithium ions to form the initial solid electrolyte interface (SEI). In order to laminate lithium metal onto or into the negative electrode, the lithium may be first deposited onto a carrier, which is then used to laminate the lithium metal onto or into the electrode structure. The coated electrode material and the lithium-deposited plastic may be placed between two rollers or two plates. Plates may be heated to about 120° C. or within the range of 25° C. to 250° C. A pressure of 50 kg/cm2 to 600 kg/cm2 may be applied to the rollers. The speed of movement of the materials through the roller pair or the plate pair may be approximately 0.1 m/min. This process may be used for either single-sided or double-sided coating.

FIG. 1 schematically illustrates a side sectional view an exemplary battery cell 10 including an anode 14, a cathode 16, a liquid electrolyte 18, and a separator 20 in accordance with one non-limiting aspect of the present disclosure. The anode 14 includes a current collector 24 and may include a group of lithium foil laminations 28 on a first side of the current collector 24 and/or a group of lithium foil laminations 30 on a second side of the current collector 24. The current collector 24 may be constructed of copper or other conductive material. The cathode 16 includes a current collector 34 and may include a first coating 36 and/or a second coating 38. The anode 14 and the cathode 16 may each include additional materials, constructions, and treatments, may include different shapes, thickness, and aspect ratios, and are not intended to be limited to the embodiments described herein.

FIG. 2 schematically illustrates a perspective view of the anode 14 with the grouping 28, 30 of lithium foil laminations 40 being arranged side-by-side and in parallel with each other relative to a long side of the current collector 24 in accordance with one non-limiting aspect of the present disclosure. The anode 14 includes the current collector 24, which may be described as including two longer sides which define a length of the current collector 24 and two shorter sides which define a width of the current collector 24. The anode 14 further includes a plurality of lithium foil laminations 40 forming the group 28 to cover a top surface of the current collector 24 with lithium foil having width greater than the individual lithium foil laminations 40. The lithium foil portions 40 may be arranged such that a longitudinal axis of each of the lithium foil portions 40 is parallel to a longitudinal axis of the current collector 24. By arranging the lithium foil portions 40 side-by-side, the lithium foil portions 40 may effectively and collectively cover a width of the current collector 24 with essentially a wider piece of lithium foil than could be provided in a single piece from lithium manufacturers. A second group 30 of lithium foil laminations 40 may be disposed upon a bottom surface of the current collector 24 in a similar manner. In another embodiment, the group 30 of lithium foil laminations 40 may be omitted from the anode 14.

FIG. 3 schematically illustrates a cutting system 50 in accordance with one non-limiting aspect of the present disclosure. The cutting system 50 may include a laminate spool 52 comprised of a continuous web, roll, reel, coil, etc. of a laminate created in accordance with the present disclosure. In the exemplary case of the laminate being of the type suitable for producing a metal anode, like the above-described lithium foil anodes, the laminate spool 52 may be unwound and fed to a cutting device 54 whereby the cutting device divides the role 52 into divisible segments forming the individual lithium foil anodes 14. One non-limiting aspect of the present disclosure contemplates fabricating the laminate spool 52 with the lithium foil laminates 40 being side-by-side and parallel to a long side of the current collector 24 such that the resulting segments form the above-described anode.

Portions of the laminate included on the laminate spool 52 may optionally be fabricated without the lithium foil laminations 40, such as by temporarily interrupting the flow of lithium foil or otherwise providing breaks or intervals where no lithium foil is laminated to the collector 24. Providing blanks or other voids to the lithium foil 40 may be beneficial in exposing the current collector 24 for connection with other circuits or devices. In addition to or in place of portions without lithium foil, portions having the lithium foil 40 may be removed after processing with the cutting system 50, i.e., a portion of the current collector 24 may be exposed after the anode 14 is cut to size by removing some of the lithium foil. Another aspect of the present disclosure contemplates portions of the laminate optionally including other materials mixed in or otherwise disposed in concert between the lithium foil laminations 40 so as to provide laminates having a width of lithium foil greater than the limited width and optionally with other, secondary materials included or mixed therewith.

Figure 5:
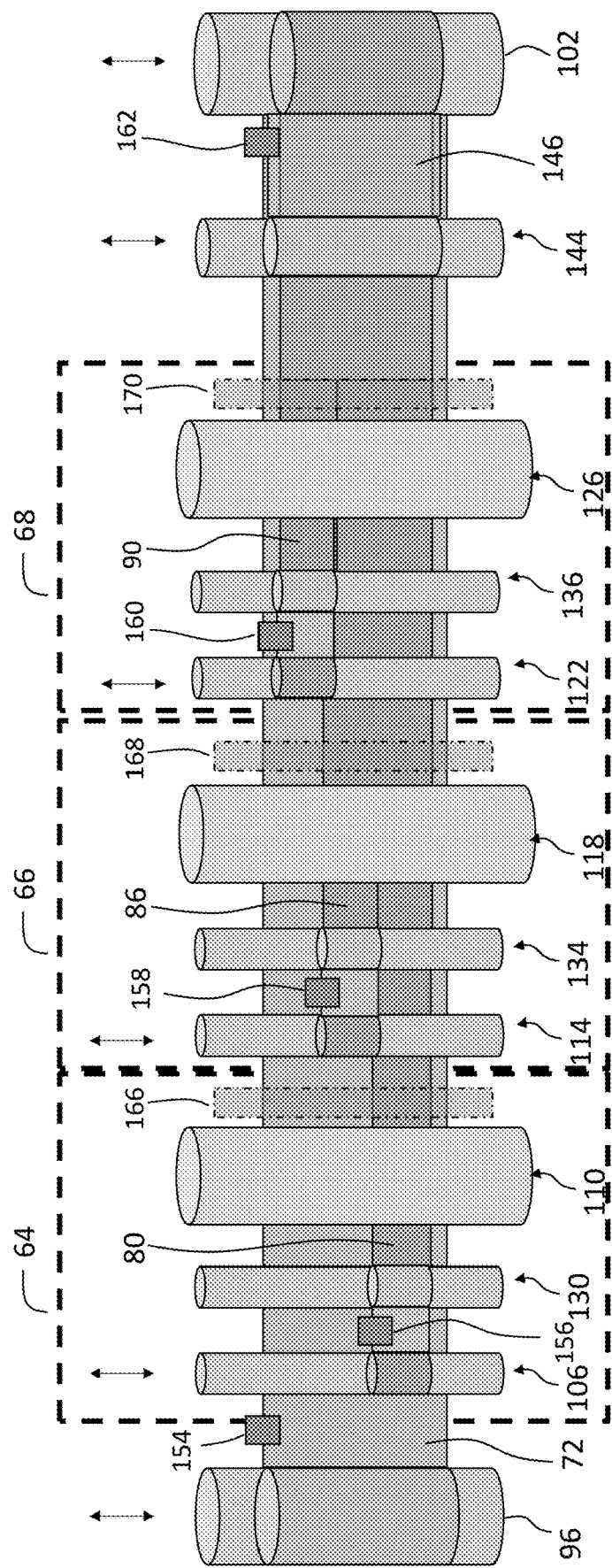

FIGS. 4-5 respectively illustrate a schematic side and top views of a modular system 60 for fabricating a laminate in accordance with one non-limiting aspect of the present disclosure. The modular system 60 is described for exemplary purposes with respect to a multi-staged approach whereby individual modules 64, 66, 68 connected end-to-end in a machine direction (MD) 70 are configured as described herein to sequentially laminate lithium foil laminations to one or both sides of a carrier or web substrate, which in the case of a lithium metal anode may be a current collector 72.

The multi-stage approach may correspond with a first module 64 producing a first laminate flow 78 having a first lithium foil lamination 80, a second module 66 producing a second laminate flow 84 having a second lithium foil lamination 86, and third module 68 producing a third laminate flow 88 having third lithium foil lamination 90. An additional number (n) of modules (not shown) may be similarly connected in sequence to provide additional lithium foil laminations such that the resulting laminate may have a width of lithium that is n times the width of the individual incoming lithium foils. Each of the lithium foil laminations 80, 86, 90 are shown to have the same cross direction (CD) 94 width, which may optionally correspond with a width of the widest available lithium foil, e.g., 100-150 mm. Other widths may be employed, particularly in circumstances where it may be desirable to have one or more lithium foil laminations 80, 86, 90 with widths narrower than some of the others.

The modular system 60 illustrates fabricating a laminate from which multiple lithium metal anodes may be cut or otherwise divisible such that the resulting anodes individually have a width of lithium foil at least three times as wide as a width of a lithium foil used in the fabrication thereof. The system 60 may include collector spool 96 having a collector flow 98 of a collector material 72 that may provide a substrate or a webbing onto which each of the within foil laminations 80, 86, 90 may be laminated. The collector flow 98 may travel in the MD 70 to a laminate spool 102 where the final laminate flow 88 is rewound. The laminate spool 102 may then be provided to the cutting system 50 described above for cutting the individual anodes therefrom.

A first lamination spool 106 having a first lamination flow 108 of the lithium foil may be unwound and fed to a first lamination roller 110. The first lamination roller 110 may produce the first laminate flow 78 by laminating the first lamination flow 108 to both sides of the collector flow 98. A second lamination spool 114 having a second lamination flow 116 of the lithium foil may be unwound and fed to a second lamination roller 118. The second lamination roller 118 may produce the second laminate flow 84 by laminating the second lamination flow 116 to the first laminate flow 78. A third lamination spool 122 having a third lamination flow 124 of the lithium foil may be unwound and fed to a third lamination roller 126. The third lamination roller 126 may produce the third laminate flow 88 by laminating the third lamination flow 124 to the second laminate flow 84. This sequence may continue with additional modules providing additional lithium foil laminations until the desired width of lithium foil is attained. In this exemplary aspect of the present disclosure, the third laminate flow 88 may be considered as the final laminate that is to be rewound onto the laminate spool 102 to thereafter be divisible into the individual lithium metal anodes.

A first interleaf rewind 130 may be configured to unwind a first interleaf 132 from the first lamination flow 108 prior to lamination. The first interleaf 132 may be a sacrificial material included to maintain integrity of the lithium foil, such as by separating individual layers of the lithium foil from each other. A second and third interleaf rewinds 134, 136 may be similarly configured to respectively unwind a second and third interleaf 138, 140 from the second and third lamination flows 116, 124. An interleaf web path for the top and/or bottom part of the machine may be adjusted. A finished interleaf spool 144 having an interleaf lamination flow 146 of a finished interleaf may be configured to interlay the interleaf lamination flow 146 with the third laminate flow 88 prior to rewind. The finished interleaf material may be a sacrificial material similar to the sacrificial material removed from the lithium foil spools and included for a similar purpose. The illustrated embodiment includes the finished interleaf material being applied to both sides of the final laminate, however, the interleaf material may provide similar results when applied to only one side of the final laminate.

A controller 150 may include a plurality of non-transitory instructions stored on a computer-readable medium, which when executed with and include a processor, may be sufficient for controlling web handling mechanisms and lamination rollers of the system 60. The instructions may be sufficient for executing operations associated with making adjustments in the flow of material relative to both of the CD 94 and MD 70, e.g., making corrections and adjustments for heat, pressure, speed, tension, alignment, etc. to facilitate aligning the lithium foil laminations and/or the interleaf relative to the current collector. A plurality of edge position systems (EPS) 154, 156, 158, 160, 162 may be included within each module 64, 66, 68 to facilitate sensing and aligning the materials. The EPSs 154, 156, 158, 160, 162 may include actuators or other devices to facilitate adjusting speed, positioning, etc. both of the CD 94 and MD 70. Inspection tools 166, 168, 170, which includes but not limited to cameras, thickness measurement system, etc. may be added to measure different quality attributes of the resulting laminate. The controller 150 may make use of this information to facilitate managing fabrication, optionally in a manner suitable to aligning the lithium foil and controlling the laminating.

Figure 6:
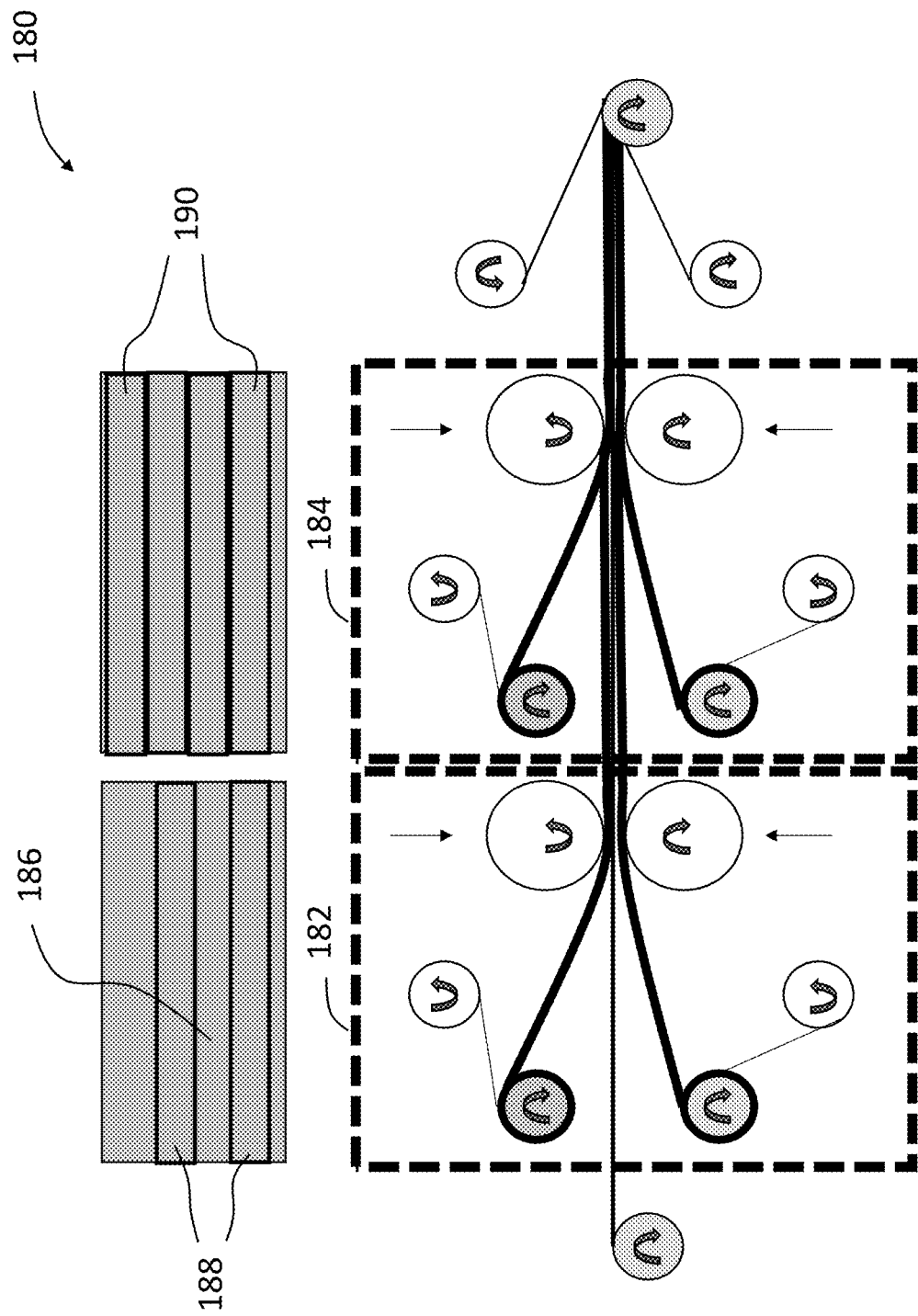
FIG. 6 illustrates a schematic side view of a modular system designed in a sequential configuration for fabricating a laminate in accordance with one non-limiting aspect of the present disclosure.
Figure 7:
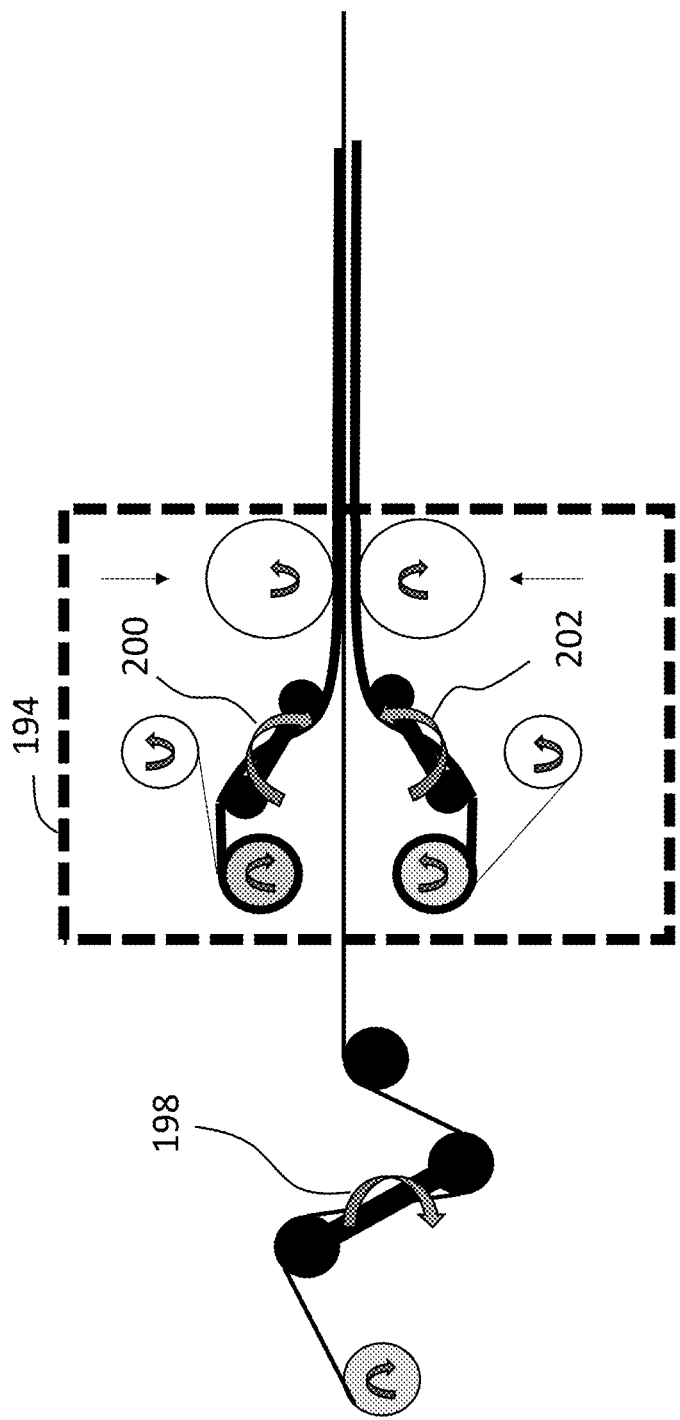
FIG. 7 illustrates a schematic side view of a module having tensioning features in accordance with one non-limiting aspect of the present disclosure.

FIG. 6 illustrates a schematic side view of a modular system 180 for fabricating a laminate in accordance with one non-limiting aspect of the present disclosure. The modular system 180 is configured to provide multiple laminations of the lithium foil with each module 182, 184, which for exemplary purposes is shown as laminating pairs 188, 190 of lithium foil laminations, with a gap 186 therebetween approximately equal to one width of a lithium foil lamination. The use of such lamination pairs, optionally on one or both sides, may be beneficial in producing a wide lamination with fewer module unites, thus less machine space. FIG. 7 illustrates a schematic side view of a module 194 having tensioning monitoring features 198, 200, 202 in accordance with one non-limiting aspect of the present disclosure. The tensioning features may also include air, magnetic, or electric breaking features, such as on elements 96 and 106, for managing tension and speed of the moving web substrates, e.g., substrates 98 or 108. Features 198, 200, 202 also provide web break detection and may be rotated to adjust tension based on an amount of reactive pressure.

FIG. 8 illustrates a control mechanism flow diagram 210 for making a laminate in accordance with one non-limiting aspect of the present disclosure. The mechanism is described for exemplary purposes with respect to fabricating a laminate having a lithium foil layer on one or both sides of a carrier substrate where the lithium foil layer has a width greater than the individual rolls of lithium foil. The mechanism is described with respect to generating the layer of lithium foil to be at least three times as wide as the individual strips of lithium foil in order to demonstrate one non-limiting aspect of the present disclosure whereby in process adjustments to tension, alignment, heat, pressure, etc. are made to align the lithium foil side-by-side with a uniform thickness. The mechanism corresponds with a modular system insofar as being divisible into a number of repeatable processes controlled according to a plurality of non-transitory instructions executable with a controller.

Block 212 relates to unwinding a web or carrier substrate from a collector spool, i.e., a current collector flow. Block 214 relates to unwinding a first lamination flow of a first material from a first lamination spool and producing a first laminate by laminating the first material to the collector material with a first lamination roller. Block 216 relates to unwinding a second lamination flow of a second material from a second lamination spool and producing a second laminate by laminating the second material to the collector material with a second lamination roller. Block 218 relates to unwinding a third lamination flow of a third material from a third lamination spool and producing a third laminate by laminating the third material to the collector material with a third lamination roller. Block 222 relates to spooling the third laminate into a laminate spool, i.e., a lithium metal anode roll, suitable for use with the cutting system or other system to process the laminate into the desired anode or other component.

Block 224 relates to a control or feedback system continuously monitoring the fabrication process and making corresponding adjustments. One type of adjustment may relate to aligning the lithium foil to assure the lithium foil laminations are side-by-side and parallel to the carrier substrate. The alignment adjustments made include adjusting the material spool locations in the CD using the EPS. Such alignment may optionally be coordinated with values for the heat and/or pressure of the lamination rollers used to control spread, thickness, surface characteristics, etc. of the finished laminate. The lithium foil is a relatively soft material that spreads when passing through one of the lamination rollers such that the amount of spreading varies according to the applied heat and pressure. To avoid the final laminate having gaps between the strips of lithium foil, one non-limiting aspect of the present disclosure contemplates aligning the lithium foil laminations to overlap and/or to have gaps therebetween such that the overlaps and/or gaps are filled or smoothed to desired consistency with the successive lamination rollers. To avoid over spreading the lithium foil and/or to avoid surface inconsistencies, one non-limiting aspect of the present disclosure contemplates correspondingly controlling heat and pressure of the lamination rollers.

The control may include, for example, successively increasing the amount of heat and/or pressure associated with each module such that the last module, i.e., the last lamination roller in the series, applies the greatest amount of heat and/or pressure, which may be referred to as a finishing heat and/or pressure. This finishing heat and/or pressure may be selected to spread the lithium foil to the final or desired thickness. The preceding modules, i.e., the lamination rollers preceding the final lamination roller, may be controlled to provide less heat and/or pressure so as to correspondingly limit compression, spreading and other effects on the lithium foil before the finishing heat and/or pressure is applied. This, for example, may include providing a minimal amount of heat and/or pressure to adhere each lithium foil lamination at each stage and/or sequentially increasing heat and/or pressure at each stage until finally finishing the fabrication with a greater amount of heat and/or pressure The minimal or successive increasing of laminating heat and/or pressure may result in the lithium foil laminations having a greater thickness or undesired characteristics until the last stage of heat and/or pressure finally achieves the final thickness and/or other characteristics.

The present disclosure may be embodied in many different forms. Representative examples are shown in the various drawings and described herein in detail as non-limiting representations of the disclosed principles. To that end, elements and limitations described above, but not explicitly set forth in the appended claims, should not be incorporated into the claims, singly or collectively, by implication, inference, or otherwise. Moreover, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

Words of approximation such as "about", "almost", "substantially", "generally", "approximately", etc., may be used herein in the sense of "at, near, or nearly at", or "within 0-5% of", or "within acceptable manufacturing tolerances", or logical combinations thereof. Also as used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function. For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the disclosure, as defined by the claims. Spatially relative terms, such as "inner," "outer," "beneath," "below," "lower," "above," "upper," and the like, may be used herein for ease of description to describe one element or feature's relationship to another element(s) or feature(s) as illustrated in the drawing figures. Spatially relative terms may be intended to encompass different orientations of the device or system in use or operation in addition to the orientation depicted in the drawing figures.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed:

1. A method of making a laminate comprising:
   unwinding a collector flow of a collector material from a collector spool;
   unwinding a first lamination flow of a first material from a first lamination spool;
   producing a first laminate by laminating the first material to the collector material with a first lamination roller positioned downstream of the collector spool, the first laminate including the first material and the collector material;
   unwinding a second lamination flow of a second material from a second lamination spool;
   producing a second laminate by laminating the second material to the collector material with a second lamination roller positioned downstream of the first lamination roller, the second laminate including the second material, the first material, and the collector material;
   unwinding a third lamination flow of a third material from a third lamination spool;
   producing a third laminate by laminating the third material to the collector material with a third lamination roller positioned downstream of the second lamination roller, the third laminate including the third material, the second material, the first material, and the collector material;
   controlling the third lamination roller to apply a third pressure for laminating;
   controlling the second lamination roller to apply a second pressure for laminating, the second pressure being less than the third pressure;
   controlling the first lamination roller to apply a first pressure for laminating, the first pressure being less than the second pressure; and
   determining the first, second, and third pressures as a function of a thickness desired for the third laminate, including setting of the third pressure to a value sufficient to spread the third laminate to the thickness and setting the first and second pressures to values insufficient to spread an entirety of either one of the first and second laminates to the thickness.

2. The method according to claim 1 further comprising producing the third laminate with the first material, the second material, and the third material on both sides of the collector material.

3. The method according to claim 1 further comprising producing the third laminate with the first material, the second material, and the third material on one side of the collector material.

4. The method according to claim 1 further comprising:
   aligning the second material on the second laminate to be side-by-side and parallel with the first material; and
   aligning the third material on the third laminate to be side-by-side and parallel with the second material.

5. The method according to claim 4 further comprising:
   aligning the second material with a second edge positioning system (EPS), the second EPS being configured to adjust the second lamination spool in a cross direction (CD), wherein the CD is defined to be perpendicular to a machine direction (MD), the machine direction corresponding with an unrolling direction of the collector material from the collector spool to the third lamination spool; and
   aligning the third material with a third EPS, the third EPS being configured to adjust the third lamination spool in the CD.

6. The method according to claim 5 further comprising:
   controlling the third lamination roller to apply a third heat for laminating;
   controlling the second lamination roller to apply a second heat for laminating; and
   controlling the first lamination roller to apply a first heat for laminating.

7. The method according to claim 6 further comprising aligning the second and third EPSs and determining the first, second, and third heats and pressures as a function of information received from one or more of a first inspection tool configured to inspect the first laminate, a second inspection tool configured to inspect the second laminate, and a third inspection tool configured to inspect the third laminate, the information identifying thickness, alignment, edge quality, and/or surface quality.

8. The method according to claim 1 further comprising:
   unwinding a first interleaf from the first lamination flow using a first interleaf rewind positioned upstream of the first lamination roller;
   unwinding a second interleaf from the second lamination flow using a second interleaf rewind positioned upstream of the second lamination roller; and
   laminating a finished interleaf to the third laminate prior to rewinding into the laminate spool.

9. The method according to claim 1 wherein the collector material substantially comprises copper and the first, second, and third materials substantially comprise lithium foil.

10. A lamination system with a modular design for fabricating a lithium metal anode to have a width at least three times as wide as a width of an incoming lithium foil, the lithium foil to be included as an integral part of the lithium metal anode, the system comprising:
    a collector spool having a collector flow of a collector material;
    a first lamination spool having a first lamination flow of the lithium foil;
    a first lamination roller positioned downstream of the collector spool, the first lamination roller configured to produce a first laminate by laminating the first lamination flow to the collector material;
    a second lamination spool having a second lamination flow of the lithium foil;
    a second lamination roller positioned downstream of the first lamination roller, the second lamination roller configured to produce a second laminate by laminating the second lamination flow to the collector material;
    a third lamination spool having a third lamination flow of the lithium foil;
    a third lamination roller positioned downstream of the second lamination roller, the third lamination roller configured to produce a third laminate by laminating the third lamination flow to the collector material; and a controller having a plurality of non-transitory instructions stored on a computer-readable storage medium and executable with a processor for:
  controlling the third lamination roller to apply a third pressure;
  controlling the second lamination roller to apply a second pressure, the second pressure being less than the third pressure;
  controlling the first lamination roller to apply a first pressure, the first pressure being less than the second pressure; and
  determining the first, second, and third pressures as a function of a thickness desired for the third laminate, including setting of the third pressure to a value sufficient to spread the third laminate to the thickness and setting the first and second pressures to values insufficient to spread an entirety of either one of the first and second laminates to the thickness.

11. The system according to claim 10 further comprising:
  a first interleaf rewind positioned upstream of the first lamination roller, the first interleaf rewind configured to unwind a first interleaf from the first lamination flow;
  a second interleaf rewind positioned upstream of the second lamination roller, the second interleaf rewind configured to unwind a second interleaf from the second lamination flow; and
  a finished interleaf spool positioned upstream of a laminate spool, the finished interleaf spool having an interleaf lamination flow of an interleaf material, the interleaf spool configured to interlay the interleaf lamination flow with the third laminate.

12. The system according to claim 10 further comprising a positioning system configured to:
  aligning the first, second, and third lamination flows such that the second lamination flow is laminated side-by-side and parallel to the first lamination flow and the third lamination flow is laminated side-by-side and parallel to the second lamination flow; and
  to adjust heat and pressure provided by the first, second, and third rollers to limit over spreading of the lithium foil.

13. The system according to claim 10 further comprising producing the third laminate with the lithium foil on both sides of the collector material.

14. The system according to claim 10 further comprising producing the third laminate with the lithium foil on one side of the collector material.

15. A controller having a processor configured for executing a plurality of non-transitory instructions stored on a computer-readable storage medium, the non-transitory instructions operable for controlling a lamination system to make a laminate by:
  unwinding a collector flow of a collector material from a collector spool;
  unwinding a first lamination flow of a first material from a first lamination spool;
  producing a first laminate by laminating the first material to the collector material with a first lamination roller positioned downstream of the collector spool, the first laminate including the first material and the collector material;
  unwinding a second lamination flow of a second material from a second lamination spool;
  producing a second laminate by laminating the second material to the collector material with a second lamination roller positioned downstream of the first lamination roller, the second laminate including the second material, the first material, and the collector material;
  unwinding a third lamination flow of a third material from a third lamination spool;
  producing a third laminate by laminating the third material to the collector material with a third lamination roller positioned downstream of the second lamination roller, the third laminate including the third material, the second material, the first material, and the collector material;
  controlling the third lamination roller to apply a third pressure;
  controlling the second lamination roller to apply a second pressure, the second pressure being less than the third pressure;
  controlling the first lamination roller to apply a first pressure, the first pressure being less than the second pressure; and
  determining the first, second, and third pressures as a function of a thickness desired for the third laminate, including setting of the third pressure to a value sufficient to spread the third laminate to the thickness and setting the first and second pressures to values insufficient to spread an entirety of either one of the first and second laminates to the thickness.

* * * * *